United States Patent [19]
Dougherty

[11] Patent Number: 6,119,711
[45] Date of Patent: Sep. 19, 2000

[54] MULTIPLE WELL HEADER SYSTEM FOR COLLECTION OF METHANE COAL GAS

[76] Inventor: Greg A. Dougherty, P.O. Box 3104, Gillette, Wyo. 82717

[21] Appl. No.: 09/411,933

[22] Filed: Oct. 4, 1999

Related U.S. Application Data

[60] Provisional application No. 60/107,944, Nov. 12, 1998.
[51] Int. Cl.[7] .................................................. B01D 17/025
[52] U.S. Cl. ........................... 137/171; 55/419; 137/203
[58] Field of Search ..................... 55/419, 465; 96/362; 137/171, 203

[56] References Cited

U.S. PATENT DOCUMENTS

| | | | |
|---|---|---|---|
| 864,158 | 8/1907 | De Lany | 55/465 |
| 1,996,257 | 4/1935 | Pyzel et al. . | |
| 2,157,829 | 5/1939 | Metzgar | 55/465 |
| 3,303,621 | 2/1967 | Hill | 55/465 X |
| 3,331,188 | 7/1967 | Sinex . | |
| 3,789,588 | 2/1974 | Laubli | 55/419 |
| 3,824,765 | 7/1974 | Williams . | |
| 3,877,904 | 4/1975 | Lowrie | 55/419 X |
| 3,957,465 | 5/1976 | Pircon . | |
| 4,214,883 | 7/1980 | Raseley et al. | 55/465 X |
| 4,268,277 | 5/1981 | Rooker . | |
| 4,369,049 | 1/1983 | Heath . | |
| 5,554,209 | 9/1996 | Dingfelder | 96/1 |
| 5,753,013 | 5/1998 | Dingfelder | 95/70 |
| 5,775,442 | 7/1998 | Speed | 175/48 |
| 5,882,383 | 3/1999 | Dingfelder | 96/55 |

OTHER PUBLICATIONS

Header System Photographed in C&H Repair Shop (Undated).

*Primary Examiner*—Gerald A. Michalsky
*Attorney, Agent, or Firm*—Flanagan & Flanagan; John R. Flanagan; John K. Flanagan

[57] ABSTRACT

A multiple well header system includes an upright header, a plurality of inlet pipes and an outlet pipe. The header has a substantially vertical orientation relative to the ground. The inlet pipes are for interconnection with separate gas wells to allow for passage of methane coal gas and water vapor entrained with the gas therethrough. Each inlet pipe is mounted to a continuous sidewall of the header through an inlet opening of the header. Each inlet pipe is in communication with an interior chamber of the header. The water vapor enters the interior chamber of the header through the inlet pipes and separates from the gas and falls to and condenses above and within a water collection area of the header. The gas enters the interior chamber of the header through the inlet pipes and rises to an upper end of the header. The inlet pipes are arranged in series vertically and in a plurality of horizontal pairs on the header. The outlet pipe is for interconnection with an external location. The outlet pipe is mounted to the sidewall of the header above the inlet pipes and is in communication with an outlet opening of the header such that gas which has risen within the interior chamber of the header enters the outlet pipe for conductance to the external location.

19 Claims, 5 Drawing Sheets

MULTIPLE WELL HEADER SYSTEM FOR COLLECTION OF METHANE COAL GAS

This patent application claims the benefit of U.S. provisional patent application Ser. No. 60/107,944, filed on Nov. 12, 1998.

BACKGROUND OF THE INVENTION

1. Field of the Invention

The present invention generally relates to systems for obtaining methane coal gas from wells and, more particularly, is concerned with a multiple well header system for the collection of methane coal gas.

2. Description of the Prior Art

Environmental air and water quality is improved in several ways when methane gas from coal deposits can be collected efficiently, safely and economically for use as fuel. First, methane coal gas collection reduces the volume of methane gas that otherwise would be released directly from the coal deposits into the environmental atmosphere. Second, increased methane coal gas utilization will reduce the growth of the demand for other conventional fuels, such as coal and oil, which produce effluents that adversely affect the quality of air and water.

Raw methane coal gas which typically has water vapor entrained therein is collected from wells sunk in coal fields. Various systems have been installed over the years for obtaining and collecting raw methane coal gas from the wells in preparation for pumping the methane coal gas into the gas pipeline distribution system. These collection systems have many well-known drawbacks.

A typical prior art gas collection system employs a header disposed at about a forty-five degree angle relative to the ground. Pipes coming from separate wells are connected to the inclined header in a series relationship with one another and at spaced apart locations on the inclined header such that the pipes are disposed at different staggered levels relative to the ground. The inclined header receives the raw methane coal gas from the separate pipes and the separation of water vapor from the gas is expected to occur in the inclined head merely due to the force of gravity on the heavier water vapor. Heretofore, water vapor separation has been both inefficient and incomplete in this prior art collection system based on the use of inclined collection heads. As a result, a substantial amount of the entrained water vapor enters into and adversely affecting the operation of the gas pipeline distribution system.

Also, in this prior art gas collection system, meters are mounted to the pipes for recording the amount of raw methane coal gas passing through the pipes prior to collection in the inclined header. The locations at which and the manner in which these meters are mounted to the pipes tends to cause settling out of water from the gas in the meters which frequently causes a water lock condition that impedes their operation.

Further, recorders on the meters have to be viewed by a worker in order to periodically take readings and make a production record. This worker commonly has to climb upon the pipes to get near enough to the recorders to visually take the readings. This procedure makes it awkward, difficult and time-consuming for the worker and actually places the worker in relatively unsafe situation which frequently results in inadequate records being taken and in some instances injury to the worker.

While this prior art gas collection system may be a step in the right direction, it falls far short of an optimum system for the collection of methane coal gas from multiple wells. As a consequence, a pressing need still exists for innovations which will overcome the aforementioned problems encountered in the collection of methane coal gas from wells without introducing any new problems in the process.

SUMMARY OF THE INVENTION

The present invention provides a multiple well header system designed to satisfy the aforementioned need. The multiple well header system of the present invention for the collection of methane coal gas is compact and more efficient than the above-described typical prior art collection system. The multiple well header system includes an upright header having a substantially vertical orientation relative to the ground with pipes coming from the separate wells being connected to the upright header through inlet pipes in vertical series and horizontal pairs at spaced apart locations. The vertical orientation of the upright header and paired arrangement of the inlet pipes allow for a high degree of compactness and the efficient separation and collection of water vapor from the raw methane coal gas as well as the placement of the meters and recorders at locations easily accessible to workers and unlikely to encourage premature separation of water from the gas. The workers do not have to undertake a cumbersome and unsafe climbing procedure just to view the recorders on the meters mounted on the pipes and make records of the amount of gas passing through the pipes.

Accordingly, the present invention is directed to a multiple well header system for the collection of methane coal gas. The multiple well header system comprises: (a) an upright header disposed in a substantially vertical orientation relative to the ground and having an upper end, a lower end, a continuous sidewall extending between the upper and lower ends and a water collection area disposed at and above the lower end, the upper and lower ends and continuous sidewall of the header defining an interior chamber, a plurality of inlet openings through the sidewall and an outlet opening through the sidewall all in communication with the interior chamber, each of the inlet openings being spaced apart from one another and disposed above the water collection area, the outlet opening being disposed above the inlet openings and below the upper end of the header; (b) a plurality of inlet pipes for interconnection with separate gas wells to allow for passage of gas and water vapor entrained with the gas therethrough from the separate gas wells to the upright header, each of the inlet pipes having open opposite ends and being mounted to the sidewall of the header through one of the inlet openings of the header in communication with the interior chamber of the header such that gas entrained with water vapor from the separate gas wells enters the interior chamber of the header through the inlet pipes where the water vapor being heavier than the gas separates from the gas and falls to and condenses above and within the water collection area of the header whereas the gas rises to the upper end of the header; and (c) an outlet pipe for interconnection with an external location and extending from the upright header and allowing for passage of gas therethrough from the header to the external location, the outlet pipe having open opposite ends and being mounted to the sidewall of the header in communication with the outlet opening of the header such that gas which has risen within the interior chamber of the header enters the outlet pipe for conductance to the external location.

More particularly, the inlet pipes are arranged in two vertical columns on the upright header. The inlet pipes of each vertical column are spaced equal distances apart from one another on the header. The inlet pipes are arranged in at least one and, preferably, in a plurality of horizontal pairs in the two vertical columns on the header. The inlet pipes of each horizontal pair are spaced the same horizontal distance from one another as the inlet pipes of the other horizontal pairs thereof. Also, each horizontal pair of inlet pipes in the vertical columns thereof are spaced apart from the other horizontal pairs by the same vertical distance.

The upright header has a baffle plate spaced from but disposed adjacent to the upper end of the header and spaced from but disposed adjacent to the outlet opening within the interior chamber of the header and mounted to the side wall of the header. The baffle plate prevents gas which has risen within the interior chamber of the header from passing directly into the outlet pipe such that any remaining entrained water vapor will tend to strike a downward facing lower side of the baffle plate and be separated from the gas as the gas is diverted by the baffle plate to pass up the lower side and over and down on an opposite upper side of the baffle plate to the outlet opening of the header. The header has a central vertical axis and the baffle plate of the header is disposed at about a forty-five degree angle relative to the central vertical axis of the header.

The upright header also has a perforated demisting plate disposed below the inlet openings of the header and above the water collection area of the header within the interior chamber of the header and mounted to the side wall of the header. The water vapor which has separated from the gas, condensed below the inlet openings of the header and settled in the water collection area of the header is substantially prevented by the perforated demisting plate from commingling with the gas and becoming re-entrained as mist in the gas.

The system further comprises a second upright header, a second plurality of inlet pipes and a second outlet pipe all substantially identical to and disposed in proximity to the first upright header, inlet pipes and outlet pipe. Also, the system comprises a connecting pipe having open opposite ends and defining an opening at an intermediate location on the connecting pipe and being mounted to each of the outlet pipes such that one of the open ends of the connecting pipe is in communication with the other of the open ends of one of the outlet pipes and the intermediate opening of the connecting pipe is in communication with the other of the open ends of the other of the outlet pipes so that gas which has risen within the interior chambers of the headers enters the outlet pipes and the connecting pipe and the other of the open ends of the connecting pipe is for interconnection to the external location.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Referring to the drawings and particularly to FIGS. 1 to 4, there is illustrated a multiple well header system, generally designated 10, of the present invention, for the collection of methane coal gas. The multiple well header system 10 basically includes an upright header 12, a plurality of inlet pipes 14 and an outlet pipe 16.

The upright header 12 of the system 10 has an elongated substantially tubular configuration and is disposed in a substantially vertical orientation relative to the ground G. The header 12 has an upper end 12A, a lower end 12B, a continuous sidewall 12C and a water collection area 18 disposed at and above the lower end 12B. Each of the upper and lower ends 12A, 12B of the header 12 may be in the form of rounded caps welded or mounted by any suitable means onto opposite open ends of the sidewall 12C. The header 12 has a length extending between the upper and lower ends 12A, 12B thereof and the sidewall 12C has a diameter which is substantially smaller than the header length. By way of example, the length of the header 12 may be 84 inches or any other suitable size and the diameter of the header 12 may be 24 inches or any other suitable size. The sidewall 12C and the upper and lower end walls 12A, 12B of the header 12 together define an interior chamber 20, a plurality of inlet openings 22 through the sidewall 12C and an outlet opening 24 through the sidewall 12C. The inlet openings 22 are disposed on an opposite side of the sidewall 12C from the outlet opening 24. The interior chamber 20, inlet openings 22 and outlet opening 24 of the header 12 are all in flow communication with one another.

Each of the inlet openings 22 of the upright header 12 has a substantially circular configuration. The inlet openings 22 are provided in side-by-side horizontal pairs and aligned in a pair of vertical columns wherein they are spaced apart from one another and disposed above the water collection area 18. The lowest pair of the inlet openings 22 is spaced from but closest to the lower end 12B of the header 12 while the highest pair of the inlet openings 22 is spaced from but closest to the upper end 12A of the header 12. The outlet opening 24 of the upright header 12 has a substantially circular configuration. The outlet opening 24 is disposed above the inlet openings 22 and below the upper end 12A of the header 12. The outlet opening 24 is disposed closer to the upper end 12A of the header 12 than to the highest pair of the inlet openings 22. The diameters of the inlet openings 22 are substantially the same. The diameter of each of the inlet openings 22 may be two, three or four inches or any other suitable size. The diameter of the outlet opening 24 is greater than the diameter of each of the inlet openings 22 and is less than the diameter of the header 12. The diameter of the outlet opening 24 may be twelve inches or any other suitable size.

Figure 1:
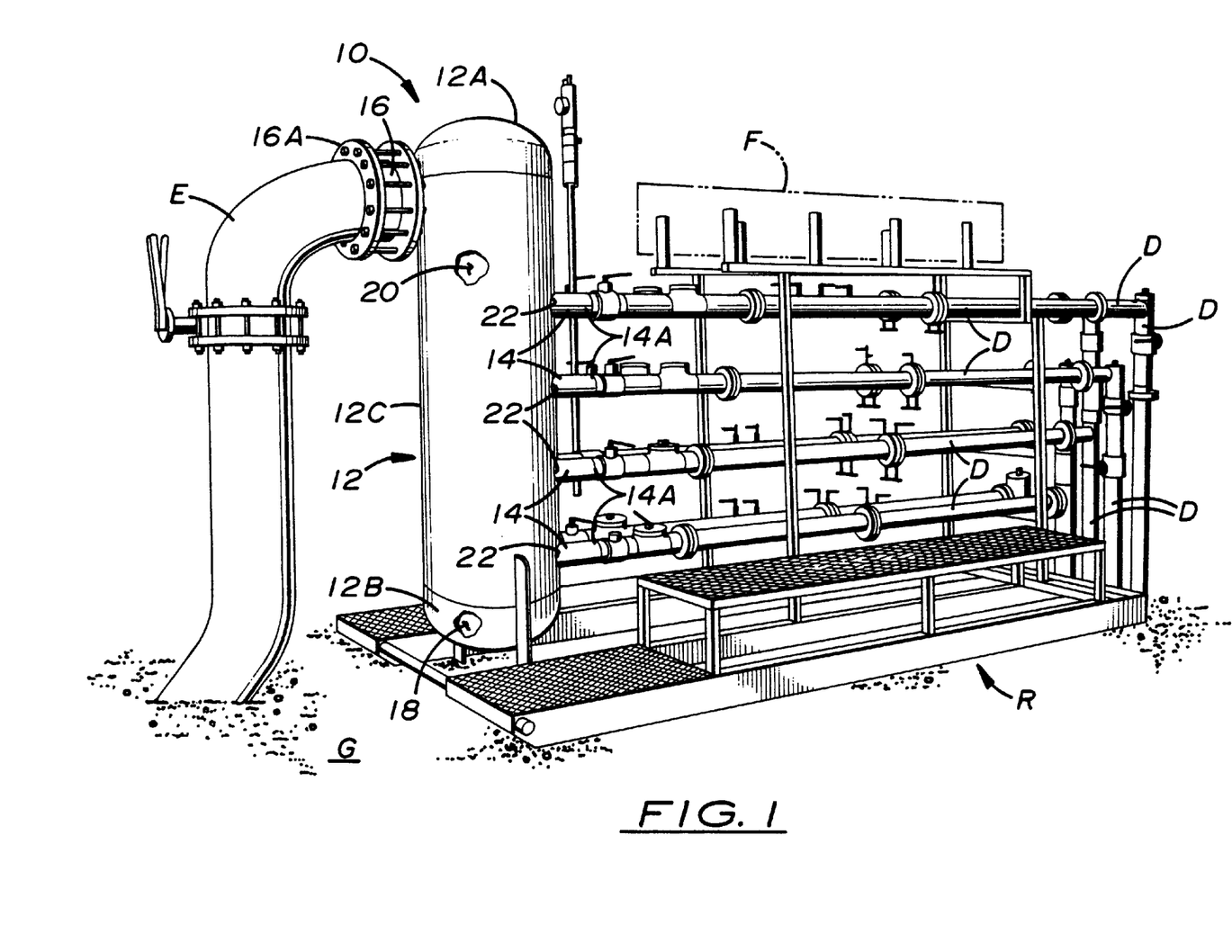
FIG. 1 is a perspective view of a multiple well header system of the present invention for the collection of methane coal gas.
Figure 2:
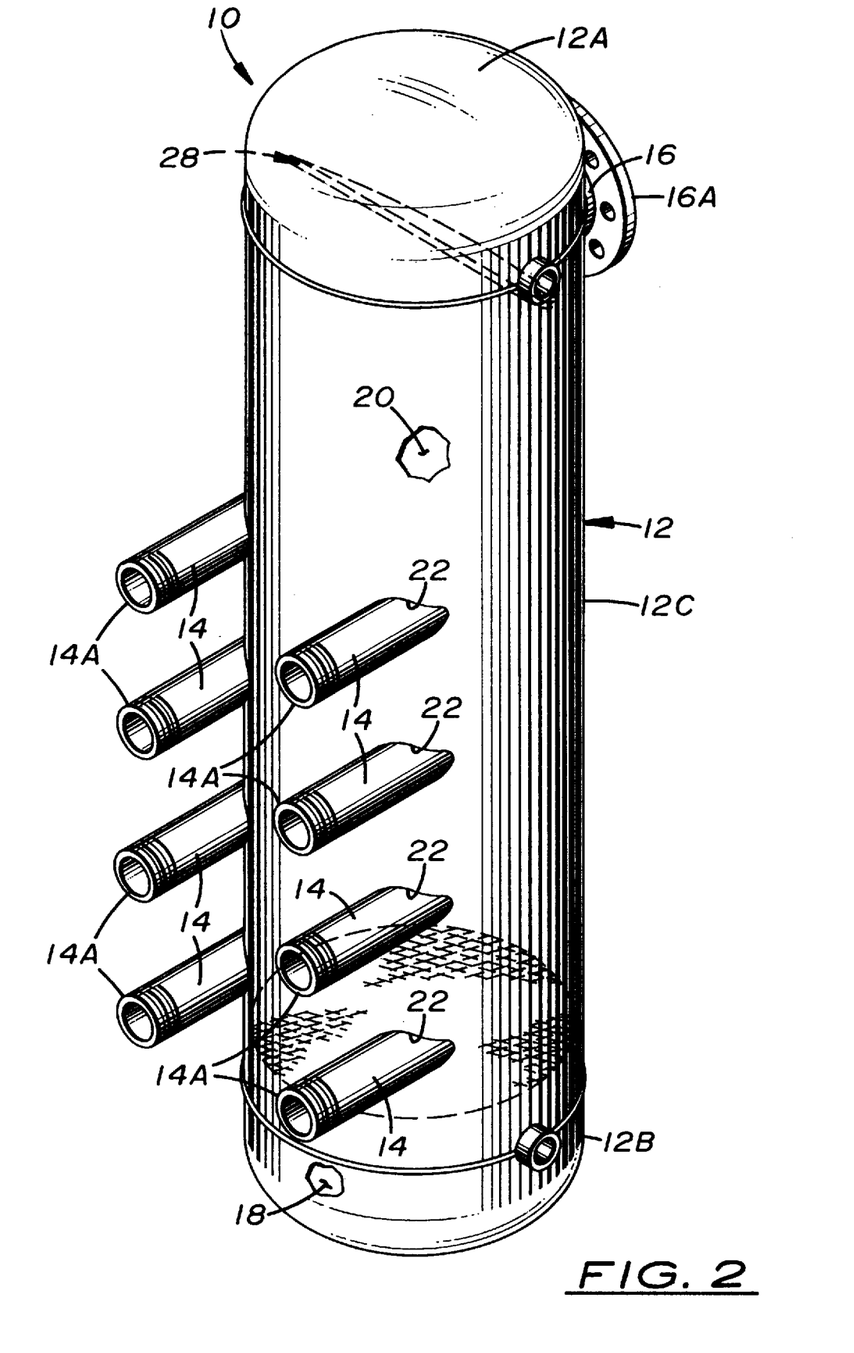
FIG. 2 is an enlarged perspective view of an upright header, inlet pipes and an outlet pipe of the multiple well header system.
Figure 3:
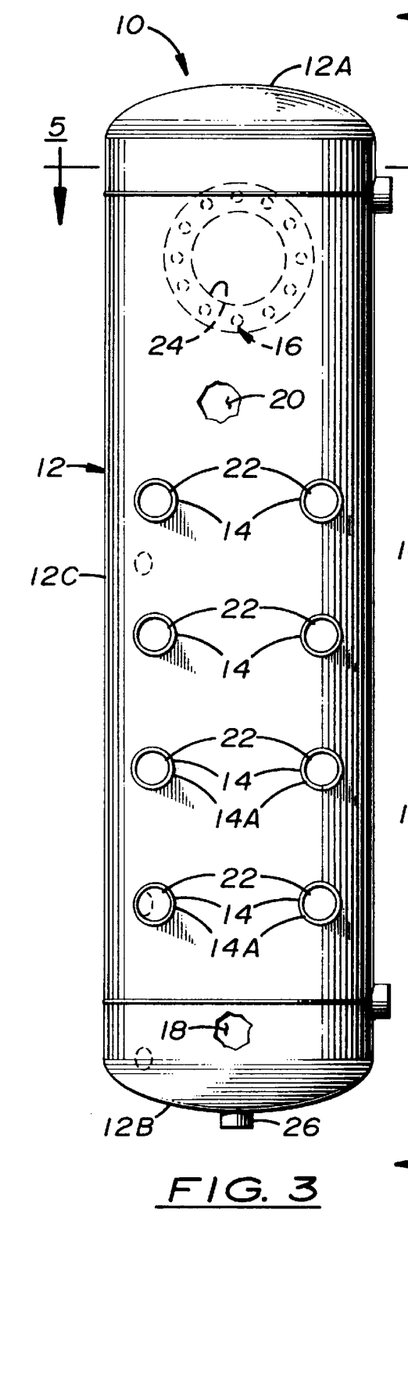
FIG. 3 is a front elevational view of the system of FIG. 2 shown on a slightly reduced scale.
Figure 4:
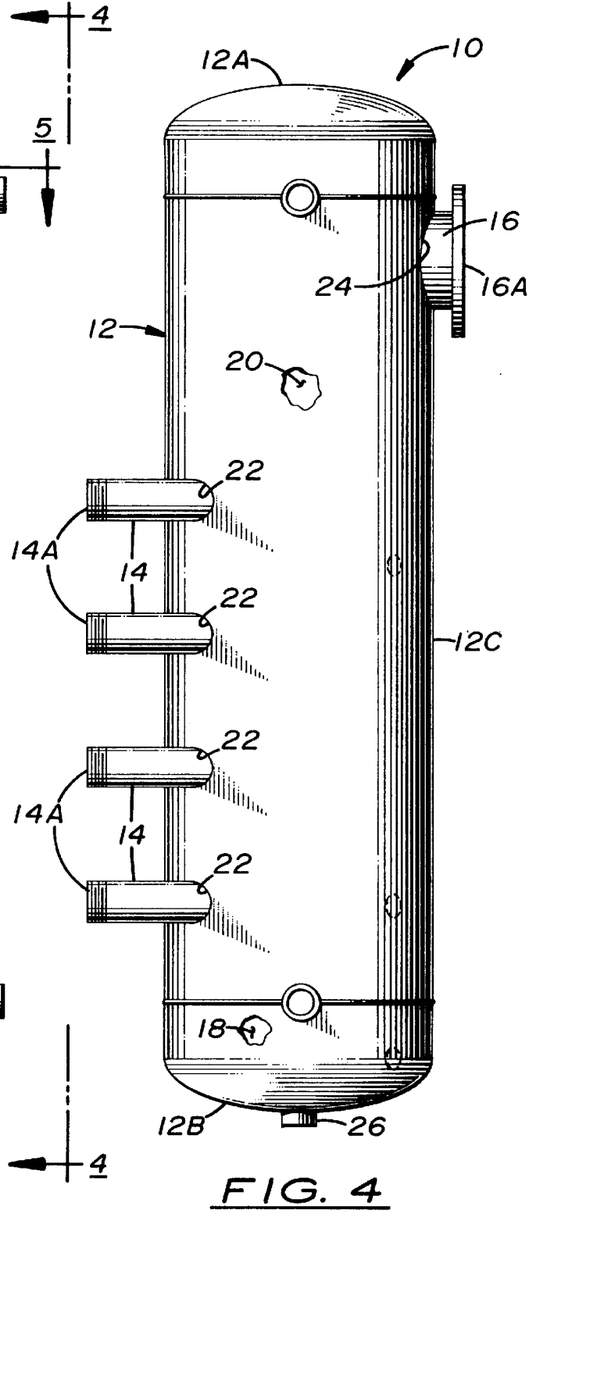
FIG. 4 is a side elevational view of the system as seen along 4—4 of FIG. 3.

Referring now to FIGS. 1 to 5, the inlet pipes 14 of the system 10 are provided for interconnection with separate gas wells (not shown) via elongated pipelines, as seen in FIG. 1, to allow for passage of flows of gas, such as methane coal gas, and water vapor entrained with the gas therethrough from the separate gas wells to the upright header 12. Each inlet pipe 14 has open opposite ends 14A. Each inlet pipe 14 has a length extending between the ends 14A which is less than the diameter of the header 12. Each inlet pipe 14 is mounted in any suitable manner, such as by welding, to the sidewall 12C of the header 12 through one of the inlet openings 22 of the header 12. Portions of each inlet pipe 14 equal in size, or in any other proportion, can be disposed exteriorly and interiorly of the sidewall 12C of the header 12. Each inlet pipe 14 is in communication with the interior chamber 20 of the header 12 such that the flows of gas entrained with water vapor from the separate gas wells enter the interior chamber 20 of the header 12 through the inlet pipes 14 moving in the same directions through one side of the sidewall 12C of the header 12 so as to strike the opposite side of the sidewall 12C of the header 12 and swirl into one another where the water vapor, being indicated as droplets A in FIG. 6, being heavier than the gas separates from the gas and falls to and condenses above and within the water collection area 18 of the header 12 whereas the gas, being indicated by wavy arrows B in FIG. 6, rises to the upper end 12A of the header 12. The gas and entrained water vapor may hit the sidewall 12C of the header 12 upon entering the interior chamber 20 of the header 12 with such contact with the sidewall 12C of the header 12 helping to separate the water vapor A from the gas B. Also, the extension of the inlet pipes 14 into the interior chamber 20 of the header 12 causes the gas to swirl as it enters the interior chamber 20 and to strike the sidewall 12C of the header 12. The vertical orientation of the header 12 allows more inlet pipes 14 to be disposed in a tighter area and gives the gas more time to rise and separate from the water vapor than in the prior art gas collection systems. The inlet pipes 14, as in the case of the inlet openings 22, are arranged in a plurality of side-by-side horizontal pairs in two vertical columns thereof on the header 12. The horizontal pairs of inlet pipes 14 of each vertical column are spaced equal vertical distances apart from one another on the header 12. The inlet pipes 14 of each horizontal pair thereof are spaced equal distances from one another. The inlet pipes 14 may be eight, ten or twelve in number and, accordingly, be four, five or six pairs, or be of any other suitable number.

The outlet pipe 16 of the system 10 is provided for interconnection with an external location. The outlet pipe 16 extends from the header 12 and allows for passage of gas therethrough from the header 12 to the external location. The outlet pipe 16 has open opposite ends 16A and a length extending between its ends 16A which is less than the length of each of the inlet pipes 14. The outlet pipe 16 is mounted to the sidewall 12C of the header 12 with one of the open ends 16A of the outlet pipe 16 is in communication with the outlet opening 24 of the header 12 such that gas which has risen within the interior chamber 20 of the header 12 enters the outlet pipe 16 for conductance to the external location. Each of the inlet pipes 14 has a diameter which is substantially the same as the diameter of the other of the inlet pipes 14. The diameter of the header 12 is greater than the diameter of the outlet pipe 16. The diameter of the outlet pipe 16 is greater than the diameter of each of the inlet pipes 14.

The upright header 12 also defines a water drainage outlet 26 through the lower end 12B and disposed within the water collection area 18. The water collection area 18 is provided for receiving water from condensed water vapor which has separated from the gas which has entered the interior chamber 20 of the header 12 from the inlet pipes 14. The water drainage outlet 26 allows the water in the water collection area 18 to exit from the interior chamber 20 of the header 12. The water drainage outlet 26 is disposed centrally or at any other suitable location on the lower end 12B of the header 12. The water drainage outlet 26 has any suitable size.

Figures 5, 6:
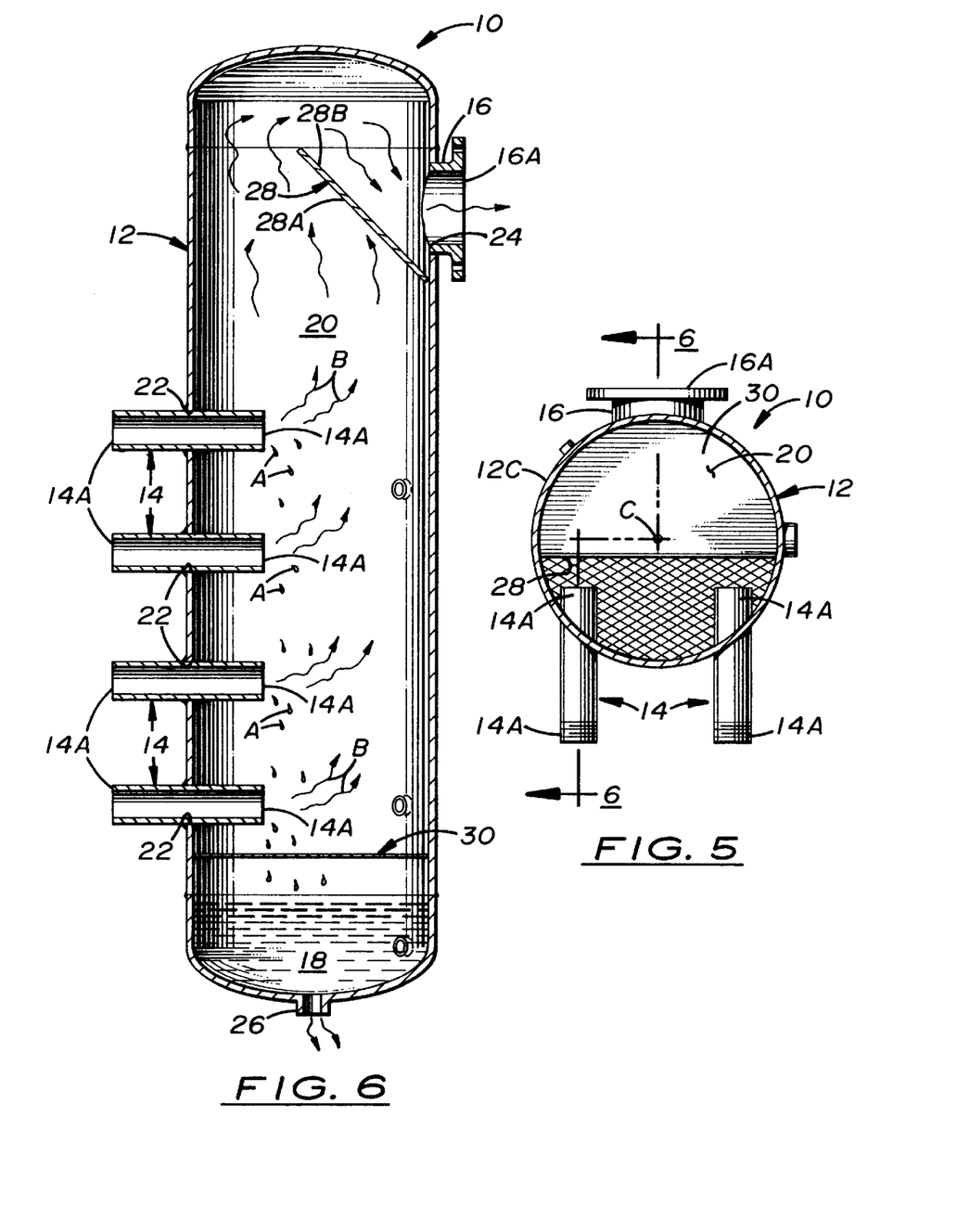
FIG. 5 is a transverse sectional view of the system taken along line 6—6 of FIG. 3.
FIG. 6 is a longitudinal sectional view of the system taken along line 6—6 of FIG. 5.

Referring now to FIGS. 1 to 6, the upright header 12 also has a baffle plate 28. The baffle plate 28 is spaced from but disposed adjacent to the upper end 12A of the header 12 and spaced from but disposed adjacent to the outlet opening 24 within the interior chamber 20 of the header 12 and mounted, such as by welding, to the sidewall 12C of the header 12. The baffle plate 28 is provided for preventing gas which has risen within the interior chamber 20 of the header 12 from passing directly into the outlet pipe 16 such that any remaining entrained water vapor will tend to strike a downward facing lower side 28A of the baffle plate 28 and be separated from the gas as the gas is diverted to pass up on the lower side 28A and over and down on an opposite upper side 28B of the baffle plate 28 to the outlet opening 24 of the header 12. The header 12 has a central vertical axis C and the baffle plate 28 of the header 12 is disposed at a forty-five degree angle relative to the central vertical axis C of the header 12. The angle of the baffle plate 28 helps keep the water vapor from passing into the outlet pipe 16 as the water vapor is heavier than the gas and is less likely to make it up and over the baffle plate 28 and down to the outlet pipe 16. The interior chamber 20 of the header 12 has a substantially circular configuration and a cross-sectional size when viewed from above. The baffle plate 28 has a substantially flat configuration. The baffle plate 28 can have a thickness of 3/16 inch or any other suitable thickness. The baffle plate 28 has a substantially semi-circular configuration and a size when viewed from above which is approximately half the cross-sectional size of the interior chamber 20 of the header 12 when also viewed from above, as shown in FIG. 5.

The header 12 also has a perforated demisting plate 30. The perforated demisting plate 30 is disposed below the inlet openings 22 of the header 12 and above the water collection area 18 of the header 12 within the interior chamber 20 of the header 12 and mounted, such as by welding, to the sidewall 12C of the header 12 such that water vapor which has separated from the gas, condensed below the inlet openings 22 and settled in the water collection area 18 of the header 12 will be substantially prevented by the perforated demisting plate 30 from commingling with the gas and becoming re-entrained as mist in the gas. The perforated plate 30 has a substantially circular configuration and a size which is substantially the same as the cross-sectional size of the interior chamber 20 of the header 12.

Figure 7:
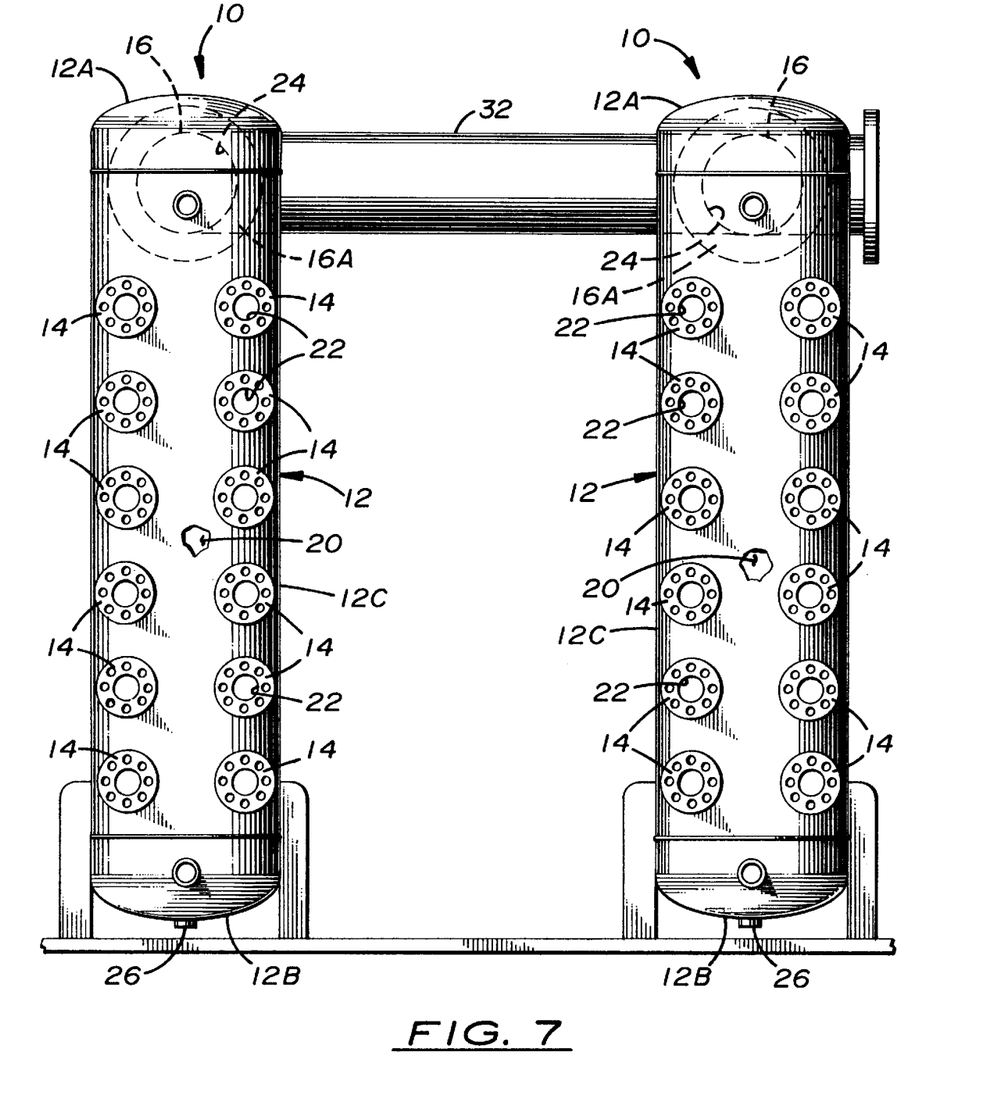
FIG. 7 is a side elevational view of the system having two upright headers, two sets of inlet pipes, two outlet pipes and a connecting pipe.

Referring now to FIG. 7, the system 10 may also include a second upright header 12, a second plurality of inlet pipes 14 and a second outlet pipe 16 all substantially identical to and disposed in proximity to the first upright header 12, inlet pipes 14 and outlet pipe 16. The system 10 may further include a connecting pipe 32. The connecting pipe 32 has open opposite ends 32A and defines an opening 34 at an intermediate location on the connecting pipe 32. The connecting pipe 32 is mounted to each of the outlet pipes 16 of the two upright headers 12 such that one of the open ends 32A of the connecting pipe 32 is in communication with the other of the open ends 16A of one of the outlet pipes 16 and such that the intermediate opening 34 of the connecting pipe 32 is in communication with the other of the open ends 16A of the other of the outlet pipes 16 so that gas which has risen within the interior chambers 20 of the headers 12 enters the outlet pipes 16 and the connecting pipe 32. The other of the open ends 32A of the connecting pipe 32 is for interconnection to the external location. The connecting pipe 32 has a length and a diameter which are substantially the same as the length and the diameter of each header 12, though may have any other suitable size.

Referring now to FIG. 1, the system 10 is part of a larger system for collecting methane coal gas from wells. The system 10 is designed to be freestanding with its own skid and meter rack R. External incoming pipeline portions D lead toward and are connected to and in communication with the other of the open ends 14A of the inlet pipes 14. An external outgoing pipeline portion E leads away from and is connected to and in communication with the other of the open ends 16A of the outlet pipe 16. Meters (not shown) and recorders (also not shown) mounted to the meters are disposed in locations F above the incoming pipeline portions D and mounted to the skid and meter rack R. Water is not prematurely trapped inside the pipeline portions D by any of the recorders and meters by virtue of their location. A person may use a ladder or the like and does not have to step on the pipeline portions D to view the recorders on the meters to make records of the amount of gas passing through the pipes. It should be pointed at that there are various orifices shown on the header 12 which which are used to attached gauges and the like (not shown).

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A multiple well header system, comprising:

(a) an upright header disposed in a substantially vertical orientation relative to the ground and having an upper end, a lower end, a continuous sidewall extending between said upper and lower ends and having vertical side portions angularly displaced from one another about said sidewall, and a water collection area disposed at and above said lower end, said upper and lower ends and continuous sidewall of said header defining an interior chamber, a plurality of inlet openings through one of said vertical side portions of said sidewall and an outlet opening through another of said vertical side portions of said sidewall such that said outlet opening is above at least most of said inlet openings and adjacent to and below said upper end of said header, said inlet and outlet openings all being in communication with said interior chamber, said inlet openings being arranged in a plurality of side-by-side pairs with one pair spaced above another pair to form a pair of vertical columns thereof on said one vertical side portion of said sidewall disposed above said water collection area;

(b) a plurality of inlet pipes for interconnection with separate gas wells to allow for passage of flows of gas and water vapor entrained with the gas therethrough from the separate gas wells to said upright header, said inlet pipes being mounted to said one vertical side portion of said sidewall of said header through said inlet openings thereof such that said inlet pipes are arranged in a plurality of side-by-side pairs of inlet pipes with one pair being spaced above another pair to form a pair of vertical columns thereof along said one vertical side portion of said sidewall, said inlet pipes having open opposite ends providing communication from exteriorly of said header into said interior chamber of said header such that the flows of gas entrained with water vapor from the separate gas wells enter said interior chamber of said header through said inlet pipes moving in substantially the same directions through said one vertical side portion of said header so as to strike an opposing vertical side portion of said header and swirl into one another where the water vapor being heavier than the gas separates from the gas and falls to and condenses above and within said water collection area of said header whereas the gas rises to said upper end of said header; and (c) an outlet pipe for interconnection with an external location and extending from said upright header and allowing for passage of gas therethrough from said header to the external location, said outlet pipe having open opposite ends and being mounted to said another vertical side portion of said sidewall of said header in communication with said outlet opening of said header such that gas which has risen within said interior chamber of said header enters said outlet pipe for conductance to the external location.

2. The system of claim 1 wherein said inlet pipes of each said vertical columns are spaced equal distances apart from one another on said upright header.

3. The system of claim 1 wherein said inlet pipes are eight in number.

4. The system of claim 1 wherein said inlet pipes are ten in number.

5. The system of claim 1 wherein said inlet pipes are twelve in number.

6. The system of claim 1 wherein said upright header has a baffle plate spaced from but disposed adjacent to said upper end of said upright header and spaced from but disposed adjacent to said outlet opening within said interior chamber of said header and mounted to said sidewall of said header, said baffle plate for preventing gas which has risen within said interior chamber of said header from passing directly into said outlet pipe such that any remaining entrained water vapor will tend to strike said baffle plate as the gas is diverted by said baffle plate to pass up on one side and over and down on an opposite side of said baffle plate to said outlet opening of said header.

7. The system of claim 6 wherein said upright header has a central vertical axis and said baffle plate of said header is disposed at about a forty-five degree angle relative to said central vertical axis of said upright header.

8. The system of claim 1 wherein said upright header has a perforated demisting plate disposed below said inlet openings of said upright header and above said water collection area of said header within said interior chamber of said header and mounted to said sidewall of said header such that water vapor which has separated from the gas, condensed below said inlet openings of said header and settled in said water collection area of said header is substantially prevented by said perforated demisting plate from commingling with the gas and becoming re-entrained as mist in the gas.

9. The system of claim 1 further comprising:

a second upright header, a second plurality of inlet pipes and a second outlet pipe all substantially identical to and disposed in proximity to said first upright header, inlet pipes and outlet pipe; and a connecting pipe having open opposite ends and defining an opening at an intermediate location on said connecting pipe and being mounted to each of said outlet pipes such that one of said open ends of said connecting pipe is in communication with the other of said open ends of one of said outlet pipes and said intermediate opening of said connecting pipe is in communication with the other of said open ends of the other of said outlet pipes so that gas which has risen within said interior chambers of said headers enters said outlet pipes and said connecting pipe and the other of said open ends of said connecting pipe is for interconnection to the external location.

10. A multiple well header system, comprising:

(a) an upright header disposed in a substantially vertical orientation relative to the ground and having an upper end, a lower end, a continuous sidewall extending between said upper and lower ends and having vertical side portions angularly displaced from one another about said sidewall, and a water collection area disposed at and above said lower end, said upper and lower ends and continuous sidewall of said header defining an interior chamber, a plurality of inlet openings through one of said vertical side portions of said sidewall and an outlet opening through another of said vertical side portions of said sidewall such that said outlet opening is above most of said inlet openings and adjacent to and below said upper end of said header, said inlet and outlet openings all being in communication with said interior chamber, said inlet openings being arranged in a plurality of horizontal pairs with one pair spaced above another pair and disposed above said water collection area, said outlet opening having a diameter greater than a diameter of each of said inlet openings;

(b) a plurality of inlet pipes for interconnection with separate gas wells to allow for passage of flows of gas and water vapor entrained with the gas therethrough from the separate gas wells to said upright header, said inlet pipes being mounted to said one vertical side portion of said sidewall of said header through said inlet openings thereof such that said inlet pipes are arranged in a plurality of horizontal pairs of inlet pipes with one pair being spaced above another pair, said inlet pipes having outer and inner portions extending exteriorly and interiorly of said sidewall of said header and terminating in open opposite ends so as to provide communication from exteriorly of said header into said interior chamber of said header such that the flows of gas entrained with water vapor from the separate gas wells enter said interior chamber of said header through said inlet pipes moving in substantially the same directions through said one vertical side portion of said header so as to strike an opposing vertical side portion of said header and swirl into one another where the water vapor being heavier than the gas separates from the gas and falls to and condenses above and within said water collection area of said header whereas the gas rises to said upper end of said header; and (c) an outlet pipe for interconnection with an external location and extending from said upright header and allowing for passage of gas therethrough from said header to the external location, said outlet pipe having open opposite ends and being mounted to said another vertical side portion of said sidewall of said header in communication with said outlet opening of said header such that gas which has risen within said interior chamber of said header enters said outlet pipe for conductance to the external location, said outlet pipe having a diameter greater than a diameter of each of said inlet pipes.

11. The system of claim 10 wherein said inlet pipes in said plurality of horizontal pairs are arranged in two vertical columns on said upright header.

12. The system of claim 11 wherein said inlet pipes of each said vertical columns are spaced equal distances apart from one another on said header.

13. The system of claim 11 wherein said inlet pipes of each horizontal pair thereof are spaced the same horizontal distance from one another as said inlet pipes of other of said horizontal pairs thereof.

14. The system of claim 11 wherein each of said horizontal pairs of inlet pipes in said vertical columns thereof are spaced apart from others of said horizontal pairs by the same vertical distance.

15. The system of claim 10 wherein said upright header has a baffle plate spaced from but disposed adjacent to said upper end of said header and spaced from but disposed adjacent to said outlet opening within said interior chamber of said header and mounted to said sidewall of said header to prevent gas which has risen within said interior chamber of said header from passing directly into said outlet pipe such that any remaining entrained water vapor will tend to strike said baffle plate and be separated from the gas as the gas is diverted by said baffle plate to pass up on one side and over and down on an opposite side of said baffle plate to said outlet opening of said header.

16. The system of claim 15 wherein said upright header has a central vertical axis and said baffle plate of said header is disposed at an acute angle relative to said central vertical axis of said header.

17. The system of claim 16 wherein said acute angle is about forty-five degrees.

18. The system of claim 10 wherein said upright header has a perforated demisting plate disposed below said inlet openings of said upright header and above said water collection area of said header within said interior chamber of said header and mounted to said sidewall of said header such that water vapor which has separated from the gas, condensed below said inlet openings of said header and settled in said water collection area of said header is substantially prevented by said perforated demisting plate from commingling with the gas and becoming re-entrained as mist in the gas.

19. The system of claim 10 further comprising:

a second upright header, a second plurality of inlet pipes and a second outlet pipe all substantially identical to and disposed in proximity to said first upright header, inlet pipes and outlet pipe; and a connecting pipe having open opposite ends and defining an opening at an intermediate location on said connecting pipe and being mounted to each of said outlet pipes such that one of said open ends of said connecting pipe is in communication with the other of said open ends of one of said outlet pipes and said intermediate opening of said connecting pipe is in communication with the other of said open ends of the other of said outlet pipes so that gas which has risen within said interior chambers of said headers enters said outlet pipes and said connecting pipe and the other of said open ends of said connecting pipe is for interconnection to the external location.

* * * * *